Aug. 20, 1935.                F. E. ASELTINE                2,011,992
                        INTERNAL COMBUSTION ENGINE
                          Filed Dec. 28, 1929         5 Sheets-Sheet 1

Inventor
Fred E. Aseltine
By
Spencer, Hardman & Fehr
His Attorneys

Aug. 20, 1935.       F. E. ASELTINE       2,011,992
INTERNAL COMBUSTION ENGINE
Filed Dec. 28, 1929       5 Sheets-Sheet 4

Inventor
Fred E. Aseltine
By Spencer Hardman & Fehr
His Attorneys

Aug. 20, 1935.  F. E. ASELTINE  2,011,992
INTERNAL COMBUSTION ENGINE
Filed Dec. 28, 1929  5 Sheets-Sheet 5

Inventor
Fred E. Aseltine
By Spencer, Hardman & Fehr
His Attorneys

Patented Aug. 20, 1935

2,011,992

UNITED STATES PATENT OFFICE 2,011,992

INTERNAL COMBUSTION ENGINE

Fred E. Aseltine, Dayton, Ohio, assignor, by mesne assignments, to General Motors Corporation, Detroit, Mich., a corporation of Delaware Application December 28, 1929, Serial No. 417,087

26 Claims. (Cl. 123—75)

This invention relates to internal combustion engines and means for supplying the fuel charge thereto.

One of the principal objects of the invention is to provide a multicylinder engine and a charge forming device therefor which is effective to secure uniform distribution of the charge to the various engine cylinders under all operating conditions.

Another object of the invention is to increase the efficiency of the engine and the economy of operation by the provision of means which will enable the engine to operate efficiently on a mixture having a lesser fuel content than it has been possible to employ heretofore.

An additional object of the invention is to increase the power of the engine for a given rate of fuel consumption.

A still further object of the invention is to provide an engine which will accelerate smoothly under any operating conditions without "missing" or "loading".

According to the present invention, all of these objects are attained by the provision of an engine having a cylinder head in which each combustion chamber is partially divided into two chambers, each of which has a separate intake valve and into one of which a mixture of fuel and air is admitted on the suction stroke of the engine piston, while the other of said chambers is simultaneously supplied with air alone. From these chambers separate passages extend to the intake ports, which are of Siamesed construction and communicate with two adjacent cylinders, but each of which comprises two separate and distinct ports, one for fuel mixture and one for air. These ports register, when the device is assembled, with separate passages in an intake manifold which in turn communicates with an air passage and with primary mixture passages formed in a carburetor unit, there being entirely separate passages in the manifold for primary mixture, each of which extends from one of said engine intake ports to one of the primary mixture passages in the carburetor unit. The air passages in the manifold, however, are joined at the inlet thereof to form one single passage, which communicates with a single main air passage in said carburetor unit.

Further objects and advantages of the present invention will be apparent from the following description, reference being had to the accompanying drawings wherein a preferred embodiment of one form of the present invention is clearly shown.

Figure 1:
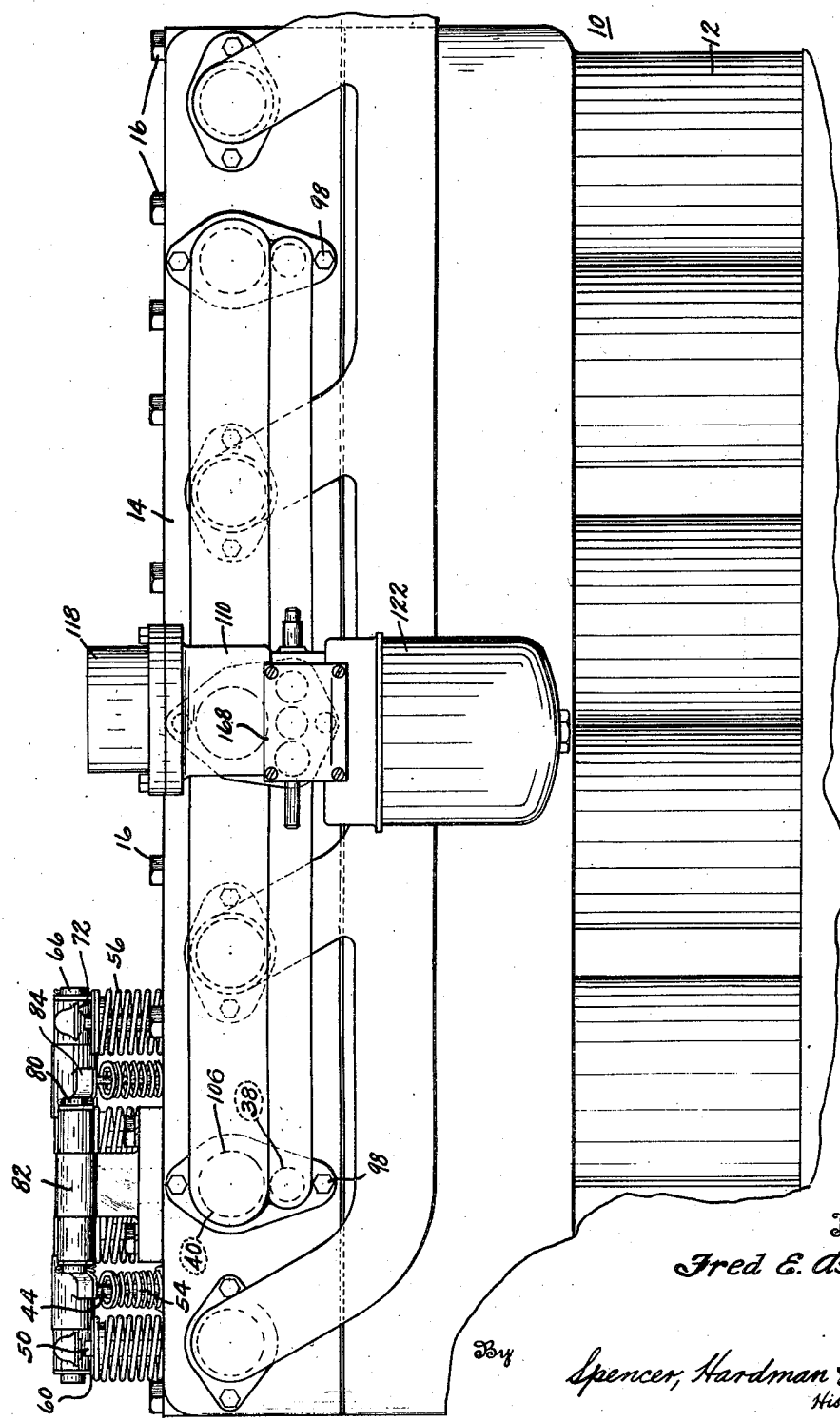
Fig. 1 is a side elevation of a cylinder block constructed in accordance with the present invention and in which certain parts have been omitted.
Figure 2:
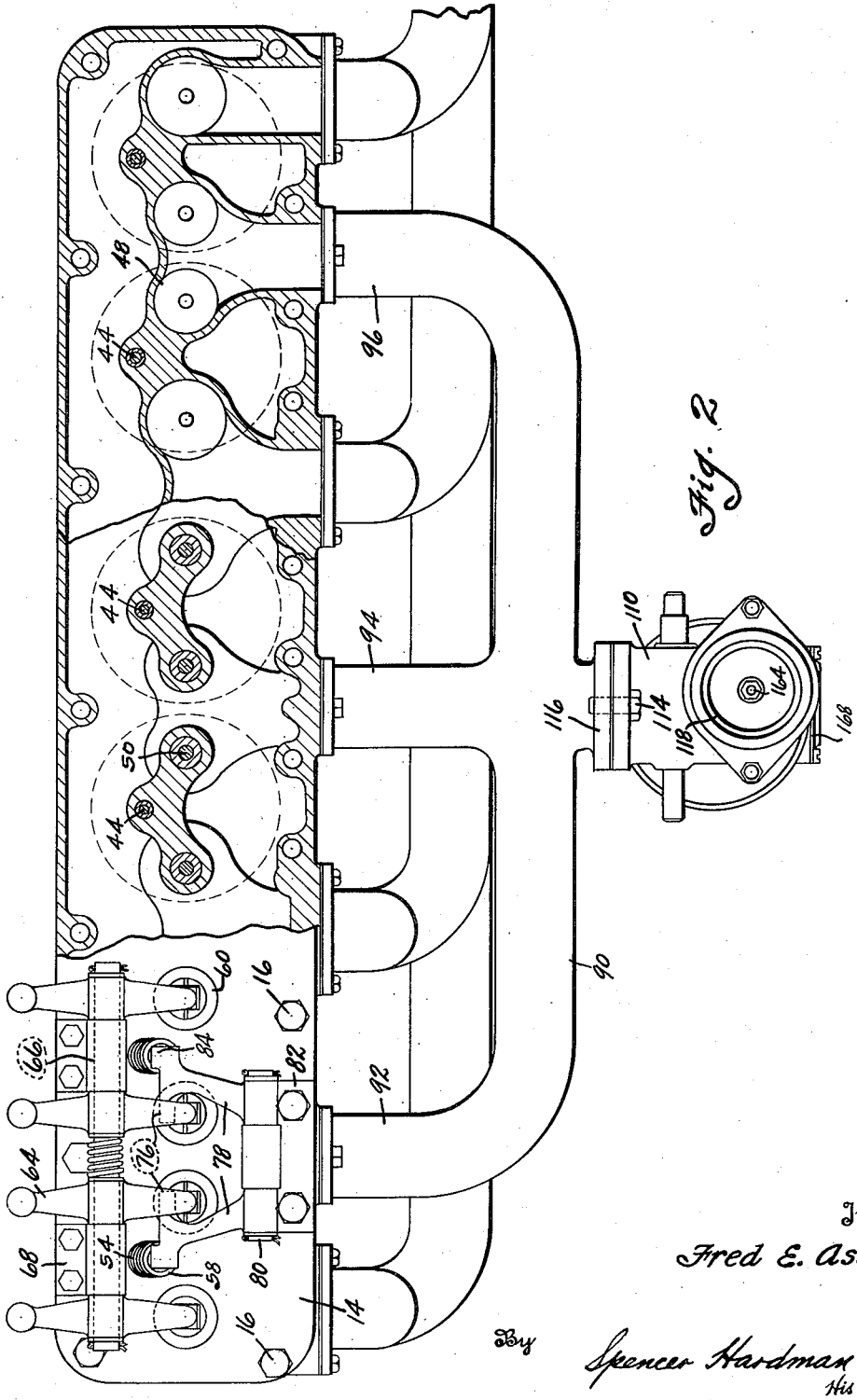
Fig. 2 is a view partly in plan and partly in horizontal section, the sectional part of said view being taken on two separate lines a—a and b—b of Fig. 4.

The engine disclosed in the drawings is, with the exception of the cylinder head, valves and valve operating mechanism one of the conventional valve-in-the-head type, the engine block being indicated in its entirety by the reference numeral 10. The engine is provided with a plurality of cylinders 12, formed in the lower part of the engine block and a cylinder head 14, which is secured to the block by bolts 16, has combustion chambers indicated in their entirety by the reference numeral 18, formed therein. Each cylinder is provided with an exhaust port 20 and controlled in the usual manner by exhaust valves. Spark plugs 22 are associated with each cylinder to ignite the charge therein. All of the details of construction of this engine is of the usual design found in engines of this type with the exception of the construction of the cylinder head, the passages supplying the charge to the combustion chamber, the valves controlling these passages and the valve operating mechanism having been modified in the manner hereinafter described.

Figure 3:
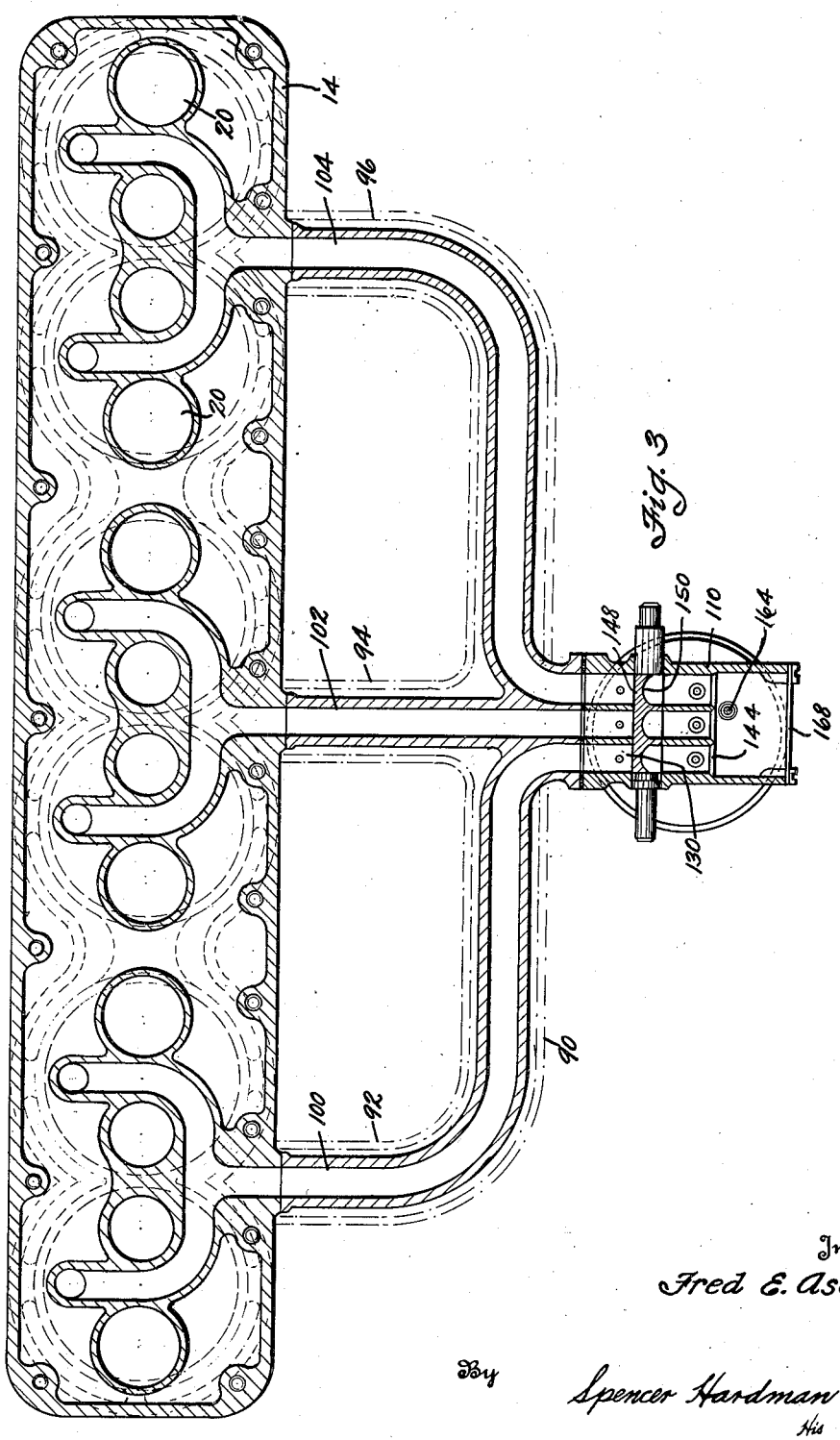
Fig. 3 is a section through the engine block on the line 3—3 of Fig. 1.
Figure 4:
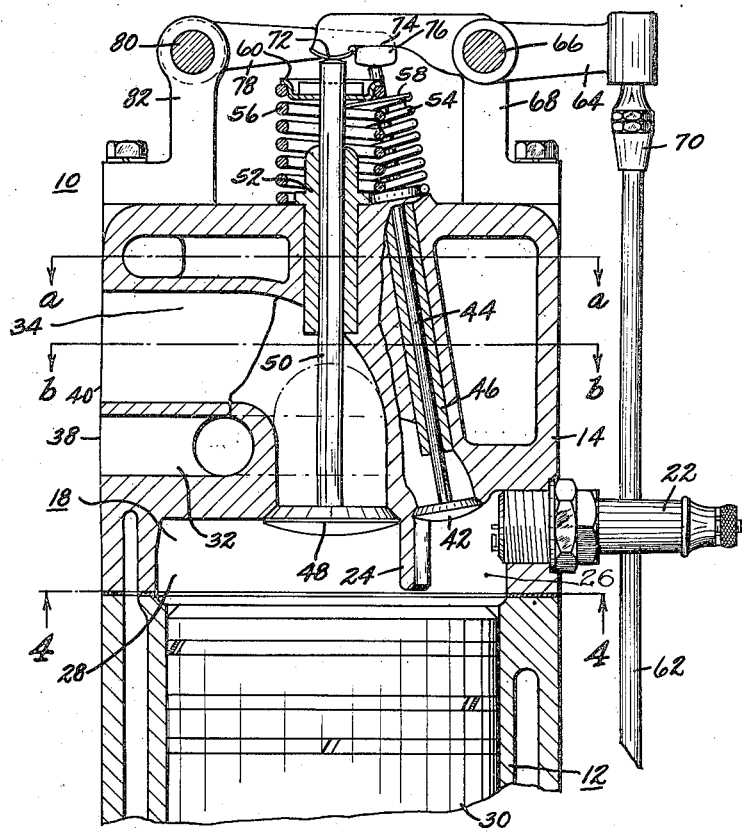
Fig. 4 is a vertical section on an enlarged scale through one of the cylinders of said engine block on the line 4—4 of Fig. 2.
Figure 5:
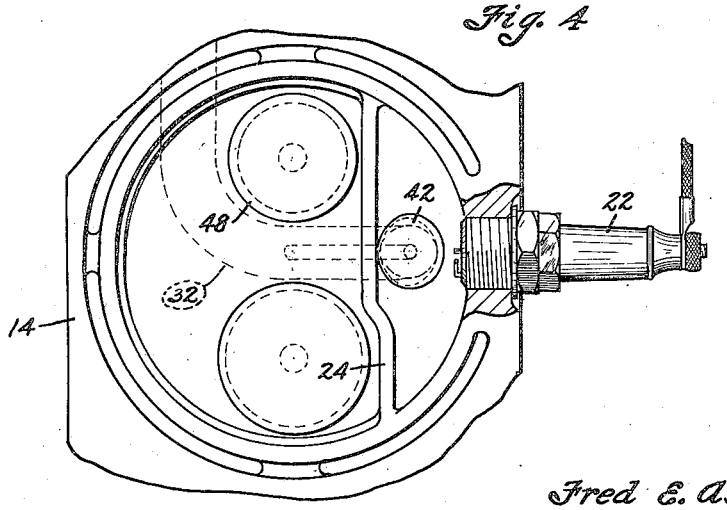
Fig. 5 is a view of the cylinder head seen from below and partly in section.

As disclosed in Fig. 4, each combustion chamber 18 is partially divided by a partition 24 into two chambers 26 and 28 which are almost entirely separated when the engine piston 30 is in its uppermost position. The partition 24 is formed integral with the casting of the cylinder head and projects downwardly toward the piston to a point a very slight distance above the top of the piston when the latter is in its top position, as shown in Fig. 4. Separate intake passages 32 and 34 are formed in the engine head and lead to the chambers 26 and 28 respectively. The passages 32 and 34 supplying two adjacent cylinders are joined as indicated in Fig. 3 and communicate with ports 38 and 40 respectively. The intake passage 32 is controlled by an intake valve 42 on the lower end of valve stem 44, which is adapted to slide in a valve guide 46 secured in position in the cylinder head casting in any desirable manner, while the passage 34 is controlled by an intake valve 48 on a stem 50 slidable in a valve guide 52, which is also secured in position in the cylinder head casting. The valves 42 and 48 are normally held closed by springs 54 and 56 respectively, which are received between the top of the cylinder head casting and collars 58 and 60 secured in any desirable manner to the valve stems 44 and 50 respectively.

The valves are adapted to be opened by a valve operating mechanism of a form which is only slightly different from the usual valve operating mechanism in the valve-in-the-head type of engine. This valve operating mechanism includes push rods 62 which are reciprocated vertically by the cam shaft (not shown) in the usual manner. Each of the push rods is connected in the well known manner to rocker arms 64 pivoted on shafts 66, arranged end to end and mounted in supports 68, bolted to the top of the engine head and extending upwardly therefrom as shown in Fig. 4. Each of the push rods is provided with a coupling 70 by means of which the length of the push rod can be adjusted in the usual manner. Each rocker arm 64 is provided with a downwardly projecting toe 72, which is adapted to engage one of the valve stems 50 directly and is also provided with a flattened surface 74 on the under side thereof, which is adapted to engage a laterally projecting ear 76 of a rocker arm 78, pivoted on a short shaft 80 mounted in a standard or support 82 similar to the support 68, but positioned on the opposite side of the cylinder head, as shown in Fig. 4. The arm 78 is provided with a laterally projecting ear 84, which is in line with the ear 76 and on the opposite side of the arm 78 therefrom. This ear extends to a position immediately above the valve stem 44 and serves to open said valve when the rocker arm is rocked to open the valve 48. The above described construction is provided for the purpose of opening the two valves 42 and 48 simultaneously at the same rate of speed and to the same extent whenever the valve operated mechanism is operated, the distance from the pivot of the rocker arm 54 to the valve stem 50 being the same as the distance from the pivot shaft 80 to the valve stem 44. Thus, the lever arms which are effective to operate the valves are of the same length and the valves must be moved in unison and to the same extent.

Associated with the above described engine head is an intake manifold indicated in its entirety by the reference character 90 and having three outlet branches 92, 94 and 96, each of which cooperates with one pair of ports 38 and 40 in the engine block. The manifold is adapted to be secured to the block by bolts 98, or in any other conventional manner and when the device is assembled, the ports 38 communicate with primary mixture passages 100, 102 and 104, which are formed in the manifold, while each port 40 registers with a passage 106 formed in each outlet branch of the manifold. The passages 106, as will be explained more fully hereinafter, are adapted to conduct air only to the ports 40 and these passages are joined together at their inlet ends to form one inlet indicated by the reference numeral 108. On the other hand, the passages 100, 102 and 104, which as will be later explained in detail, are adapted to supply a primary mixture to the ports 38, are formed as separate passages in the manifold and communicate with separate primary mixture passages in a carburetor unit hereinafter more fully described.

Figure 6:
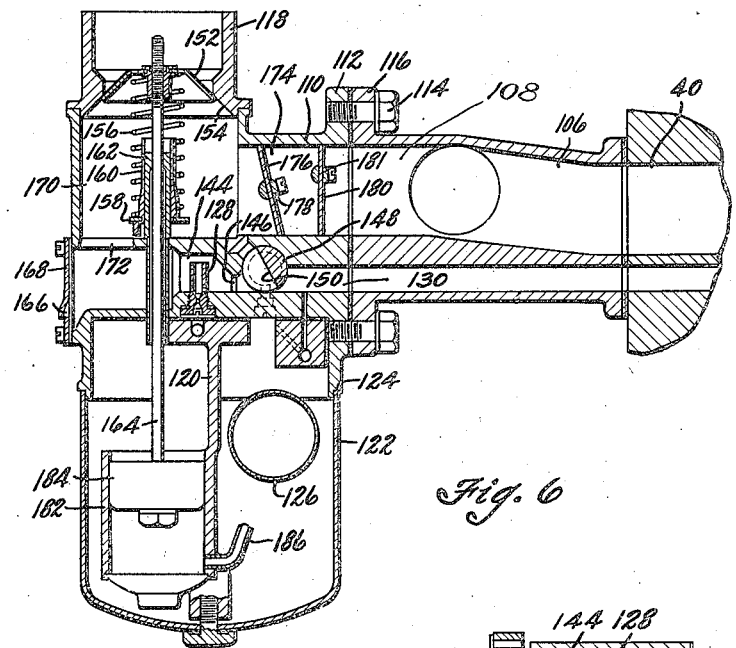
Fig. 6 is a vertical, longitudinal section through the carburetor unit.

The carburetor unit, shown in the drawings, which is of the same design as that fully disclosed in the application of Fred E. Aseltine, Carl H. Kindl and Wilford H. Teeter, Serial No. 288,683, filed June 27, 1928, comprises a main housing 110, which is provided with an attaching flange 112, adapted to be secured by screws 114 to a flange 116 and the inlet end of the manifold, as indicated in Fig. 6. An air inlet coupling 118 is secured in position to register with an opening in the upper wall of the housing 110 in any suitable way and may be connected with the air cleaner if desired. A casting 120 in which the passages supplying fuel to the nozzles are formed, is secured to the lower wall of the housing 110 by screws or in any other desirable manner and a sheet metal fuel bowl 122 is held tight against an annular shoulder 124 on the housing 110 in any suitable way. Fuel is conducted from a main source of supply to the fuel bowl through a conduit (not shown) and the flow of fuel to the bowl is controlled by a float 126 operating in the usual way to maintain a substantially constant fuel level in the fuel bowl.

Fuel flows from the bowl 122 to a plurality of primary fuel nozzles 128, one of which is located in each of three primary mixing chambers 130, the construction of which is fully described in the above mentioned application. The fuel conduit between the fuel bowl and the nozzles comprises a vertical fuel passage 132, which communicates at its upper end with horizontal fuel canal 134, which is in direct communication with the fuel nozzles. A fixed metering orifice admits fuel to the passage 132 at all engine speeds and an orifice 138 controlled by a valve 140 supplies additional fuel to the passage 132 at relatively high speeds in the manner described in the earlier application. Fuel is drawn from the nozzles into the mixing chambers by the suction therein and a check valve 142 prevents return of the fuel to the fuel bowl on reduction in the engine suction. The specific construction of the fuel nozzles is immaterial so far as the present invention is concerned and being fully described in the above mentioned application, will not be described in detail herein.

Figure 7:
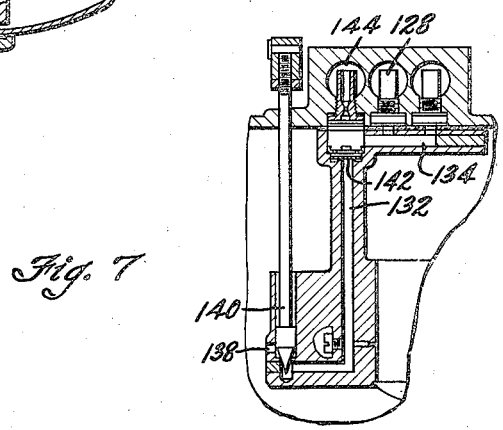
Fig. 7 is a fragmentary section on the line 7—7 of Fig. 6.

The primary mixing chambers comprise the enlarged anterior ends of primary mixture passages 144, which are parallel and close together, as indicated in Figs. 3 and 7. When the carburetor is secured to the manifold, these primary mixture passages register with 100, 102 and 104 hereinbefore described. Restrictions 146 separate the primary mixing chambers from the primary mixture passages proper to reduce the velocity of flow past the fuel nozzles for the purpose set forth in the earlier application.

A single throttle valve 148 extends across all of the primary mixture passages and controls the flow therethrough, being provided with grooves 150, which register with said passages. Air is admitted to the carburetor through the coupling 118 and is controlled by a valve 152 normally held against a seat 154 by a spring 156, received between the valve and a flange 158, projecting from a sleeve 160, slidably mounted on a stationary sleeve 162, fixed in the main housing and serving as a guide for a stem 164 to which the air valve is secured. The sleeve 160 is adapted to be lifted to hold the valve in closed position to choke the carburetor when starting, by means disclosed in the above mentioned application, and sufficient air to carry the starting fuel from the nozzles to the engine cylinders is admitted through a slot 166, formed in a plate 168, secured to the main housing as shown in Fig. 6.

The valve 152 admits air to a chamber 170 from which air passes through an opening 172 in the floor of said chamber to the primary mixing chambers and to the passage 108 in the manifold through a passage 174, which registers with passage 108 when the carburetor unit is attached to the manifold. The flow of air through the passage 174 is controlled by a manually operable throttle 176 secured to a shaft 178 journalled in the main housing and a suction operated valve 180 secured to a shaft 181 also journalled in the housing.

The operating connections for the throttle and the valves 176 and 180 constitute no part of this invention and will not be described in detail herein, it being sufficient for the purposes of this disclosure to state that the primary throttle is connected by a lost motion connection to the valve 176 which permits a predetermined movement of said primary throttle independent of the valve. This connection is capable of adjustment and is generally so adjusted that the primary throttle is movable without accompanying movement of the valve 176 until the former reaches a position corresponding to a vehicular speed of approximately 15–20 miles per hour on the level, while on further opening of the primary throttle, the valve 176 is moved simultaneously therewith.

Whenever the throttle is opened, the air valve is opened to admit additional air and the opening of this valve is retarded to prevent fluttering and to restrict the admission of air so as to enrich the mixture to some extent. For this purpose a dashpot is provided comprising a cylinder 182 and a piston 184 secured to the lower end of the valve stem by any suitable means. This dashpot may be of the construction disclosed in the above mentioned application or of any other conventional form, the construction of said dashpot being entirely immaterial so far as the present invention is concerned.

The suction operated valve 180 is opened whenever the valve 176 is opened and the opening movement of said valve is retarded in the manner disclosed in the earlier application in order to prolong the time required for the air to reach the engine cylinders so that air will not be admitted to said cylinders sufficiently rapidly following any opening of the throttle to lean the mixture. In addition to the means for retarding the opening of the valve, a pump is provided to supply additional fuel to the mixture passages in order to enrich the mixture to some extent during the acceleration period. The dashpot which controls the main air valve is employed as a fuel pump and to that end a fuel delivery passage 186 is connected to the cylinder 182 near the bottom and is adapted to supply fuel to the primary mixture passages in the manner fully disclosed in the above application on all opening movements of the throttle.

The operation of the above described device is substantially as follows: A primary mixture of fuel and air is formed in the primary mixing chambers of the carburetor unit in the same manner as in the earlier application. This primary mixture is conducted through the passages 144, 102, 104 and 106 to the combustion chambers 26 of all the cylinders whenever the intake valves 42 are opened. This mixture is of proper combustible proportions at all engine speeds below that at which the valve 176 is opened to admit air through the passage 174. At speeds above that at which the valve 176 is opened, the primary mixture supplied to the combustion chamber 26 is considerably richer than the normal combustible mixture and is diluted with air which is supplied through the passage 104 in the carburetor unit and the passage 108 in the manifold to the combustion chambers 28 of the engine, the valves 42 and 48 being opened simultaneously. As the piston is not close to the partition 24 during most of the suction stroke a part of the rich mixture entering chamber 26 will mix with the air in chamber 28, forming a lean mixture therein. The primary mixture admitted to the combustion chambers 26 is ignited by spark plugs 22 and when the valve 176 is opened and some of the mixture admitted to the chambers 26 mixes with the air admitted to the chamber 28 as above described, the mixture in both said chambers 26 and 28 is ignited, the small quantity of relatively rich mixture closely adjacent the spark plugs being ignited directly by the spark while the leaner mixture contained in the chambers 28 is ignited by flame propagation from the chambers 26. When the mixture is ignited in this manner a much leaner mixture may be used than it has been found possible to employ heretofore without considerable loss in engine efficiency and power. It will be obvious that the carburetor may be variably adjusted for any particular engine and intake passages of different size may be provided for various different engines which are of varying efficiency.

It will also be clear that by providing a separate passage from each primary mixing chamber to that cylinder which is supplied by that particular mixing chamber, much better distribution of the fuel will be secured than has been heretofore possible because the fuel charge is delivered to each of the cylinders direct and is not delivered to the manifold. Therefore during the suction stroke of the piston in any given cylinder, the suction created thereby is not communicated to any other primary mixture passage than that associated with the particular cylinder in which the piston is making its suction stroke, and there is no accumulation of fuel at any time in the branches of the manifold, which is of great importance, particularly in multicylinder engines employing Siamesed intake ports. In such engines where a primary mixture conduit supplies primary fuel mixture to each outlet branch of the manifold, as described in the earlier application above referred to, all the primary mixture passages are subject to the suction communicated to the manifold, not only from the engine cylinders to which any particular primary mixture passage supplies fuel mixture but from every other cylinder to some extent. There is, therefore, some accumulation of fuel in each manifold branch when other cylinders than those associated with that particular branch are fired. This will result in unequal accumulations of fuel in the manifold branches because the firing order of an engine of the type referred to is such that the time intervals between the firing of adjacent cylinders is not the same, hence it has been found that one cylinder of any pair of cylinders will receive a greater amount of fuel than the other cylinder of said pair. In the device shown herein, however, this difficulty is completely avoided. On the suction stroke of the piston in any one cylinder mixture is drawn only into that particular cylinder and the other primary mixture passages are entirely unaffected. By this means, substantially equal distribution of fuel to all the cylinders of the engine is secured and greatly improved engine operation is obtained.

Also, it has been found that by igniting a small portion of the total charge which is relatively rich and firing the entire charge by flame propagation when the rich primary charge is ignited, it is possible to increase, not only the efficiency of the engine and the economy of its operation but that the power of said engine for any given rate of fuel consumption can be increased. Since a leaner than normal mixture can be employed with no reduction in engine efficiency and without reduction in power it should be obvious that by providing a mixture of normal proportions and igniting it in the manner described, the power of the engine will be increased.

It has also been found that operation of an engine of the type described, during the acceleration period is improved. Since the primary mixture passages extend directly from the carburetor unit to the engine cylinders with substantially no admission of air thereto, the velocity through such passages is considerably greater on opening movements of the throttle than when the mixture is conveyed to the cylinders through a manifold to which additional air is admitted on opening movements of said throttle, resulting in a reduction velocity of flow through the primary mixture passages. Because of this high velocity through the primary mixture passages, there is no substantially temporary dilution of the mixture following opening of the throttle; smoother and more rapid acceleration is secured and "missing" of the engine during the acceleration period is eliminated.

While the carburetor unit which is illustrated herein is that disclosed in the earlier copending application referred to, it will be understood that it is not necessary to employ a carburetor unit of this particular type, the specific structure of the carburetor unit not being material so far as this invention is concerned. Moreover, it will also be understood that while this device is disclosed in a six-cylinder engine and is particularly suitable for this specific type of engine, it is not limited in any way to an engine of any particular number of cylinders.

While the form of embodiment of the present invention as herein disclosed, constitutes a preferred form, it is to be understood that other forms might be adopted, all coming within the scope of the claims which follow.

What is claimed is as follows:

1. An internal combustion engine having a cylinder in which is formed a combustion chamber, separate ports for admitting separate charges of fuel mixture and air only to said combustion chamber, a charge forming device associated with said engine and including means for supplying fuel mixture through one of said ports under all conditions of operation, and means operative only under certain operating conditions for supplying air to the other of said ports, said means being designed to supply air only when operative.

2. In combination an internal combustion engine having separate passages formed therein to convey separate charges of fuel mixture and air to the combustion chamber, a charge forming device associated therewith and including a mixing chamber in which a primary mixture of fuel and air is formed, means for supplying auxiliary air only under all operating conditions and conduits for separately conducting the primary mixture and auxiliary air from the charge forming device to the said separate passages.

3. In combination an internal combustion engine having separate passages formed therein to convey separate charges of fuel mixture and air to the combustion chamber, a charge forming device associated therewith and including a carburetor unit having a mixing chamber in which is formed a primary mixture of fuel and air, a secondary air passage therein and means connecting the carburetor unit with the engine having separate passages formed therein for conducting fuel mixture and air separately to the separate passages formed in the engine, said air passage conveying air only when operative.

4. A charge forming device for an internal combustion engine comprising a carburetor unit having a primary mixing chamber formed therein, means for supplying fuel and air thereto, a separate passage for supplying secondary air only under all operating conditions; and means connecting said carburetor unit with the engine having separate passages formed therein and adapted to convey the primary mixture and secondary air respectively to the combustion chamber, said passages having no communication with each other.

5. In combination with a multicylinder internal combustion engine having separate passages formed therein to convey separate charges of fuel mixture and air to each cylinder, a charge forming device comprising a carburetor unit having a plurality of primary mixture passages in which a primary mixture of air and fuel is formed, a secondary air passage therein and a manifold having a plurality of primary mixture conduits therein connecting each of the primary mixture passages with one of the fuel mixture passages in the engine and an air conduit connecting the secondary air passage with all of the air passages formed in the engine.

6. An internal combustion engine having a cylinder in which is formed a combustion chamber, a plurality of intake passages leading to said combustion chamber, means for supplying air only to one of said passages under all operating conditions, means for supplying fuel mixture to the other of said passages under all operating conditions, separate intake valves controlling the flow through said passages and a single operating member for operating both said valves.

7. A charge forming device for a multi-cylinder engine having a plurality of intake ports, comprising a plurality of primary carburetors, provided with means for admitting fuel and air thereto, a plurality of passages leading from said primary carburetors to the engine intake ports, means admitting secondary air to be mixed with said primary mixture and passages leading from air admitting means to the engine intake ports, said last named passages being entirely separate from and having no communication with the passages from the primary carburetors.

8. A charge forming device for a multi-cylinder engine having a plurality of intake ports, comprising a plurality of primary carburetors provided with means for admitting fuel and air thereto, a plurality of passages leading from said primary carburetors to the engine intake ports, a single air inlet supplying secondary air to be mixed with said primary mixture and passages leading from said single air inlet to the engine intake ports, said last named passages having no communication with the primary mixture passages.

9. A charge forming device for a multi-cylinder engine having a plurality of intake ports, comprising a plurality of primary carburetors, one for each intake port, means for supplying fuel and air to each primary carburetor, a main air inlet, and mixture and air conduits extending from said primary carburetors and air inlet respectively, to the engine cylinders, said conduits being separate and having no communication with each other.

10. A charge forming device for a multi-cylinder engine having a plurality of intake ports, comprising a carburetor unit having a plurality of primary carburetors formed therein, an air inlet passage in said carburetor unit, a manifold interposed between the carburetor and the engine intake ports, passages in said manifold communicating with the primary carburetors and air inlet passage respectively, said passages in the manifold being separate and having no communication with each other.

11. In combination, a multicylinder engine having a plurality of intake ports, each of which comprises a plurality of openings adapted to communicate with separate passages leading to the engine cylinders, a carburetor unit therefor having a mixture outlet passage and an air supply passage formed therein, a manifold interposed between the carburetor unit and the engine intake ports, said manifold having means for conveying the mixture from the carburetor unit to one of the openings at each intake port and means for conveying air from the air supply passage to the other of said openings at each intake port.

12. In combination, a multicylinder engine having a plurality of intake ports, each of which comprises a plurality of openings adapted to communicate with separate passages leading to the engine cylinders, a carburetor unit therefor having a plurality of primary carburetors and an air supply passage formed therein, a manifold interposed between the carburetor unit and the engine intake ports, said manifold having a plurality of mixture passages therein, each of which connects one of said primary carburetors with one of the openings at one of said intake ports, and air passages in said manifold connecting the air supply passage with one of the openings at all of the intake ports, said mixture and air passages in the manifold having no means of communication with each other.

13. In combination, an internal combustion engine having separate passages formed therein to convey separate charges of fuel mixture and air to the combustion chamber, a charge forming device associated therewith including a carburetor unit having a primary mixing chamber formed therein, means for supplying fuel and air thereto to form a primary fuel mixture, an auxiliary air inlet in said carburetor unit, separate conduits connecting the separate passages in the engine with the primary mixing chamber and auxiliary air inlet respectively whereby one of said conduits conveys air only under all operating conditions and the other fuel mixture, and separate means for controlling the flow through said conduits.

14. In combination, an internal combustion engine having separate passages formed therein to convey separate charges of fuel mixture and air to the combustion chamber, a charge forming device associated therewith including a carburetor unit having a primary mixing chamber formed therein, means for supplying fuel and air thereto to form a primary fuel mixture, an auxiliary air inlet in said carburetor unit, separate conduits connecting the separate passages in the engine with the primary mixing chamber and auxiliary air inlet respectively whereby one of said conduits conveys air only and the other fuel mixture, and means for controlling the flow through said conduits, said means being constructed to enable a flow through one of said conduits under all operating conditions and to prevent flow through the other of said conduits under certain operating conditions.

15. In combination, an internal combustion engine having separate passages formed therein to convey separate charges of fuel mixture and air to the combustion chamber, a charge forming device associated therewith including a carburetor unit having a primary mixing chamber formed therein, means for supplying fuel and air thereto to form a primary fuel mixture, an auxiliary air inlet in said carburetor unit, separate conduits connecting the separate passages in the engine with the primary mixing chamber and auxiliary air inlet respectively whereby one of said conduits conveys air only under all operating conditions and the other fuel mixture, and means for controlling the flow through said conduits, said means being constructed to prevent a flow of air through one of said conduits under certain operating conditions while permitting a flow of fuel mixture through the other of said conduits.

16. In combination, an internal combustion engine having separate passages formed therein to convey separate charges of fuel mixture and air to the combustion chamber, a charge forming device associated therewith including a carburetor unit having a primary mixing chamber formed therein, means for supplying fuel and air thereto to form a primary fuel mixture, an auxiliary air inlet in said carburetor unit, separate conduits connecting the separate passages in the engine with the primary mixing chamber and auxiliary air inlet respectively whereby one of said conduits conveys air only and the other fuel mixture, a primary throttle for controlling the flow of fuel mixture through one of said conduits and a secondary throttle operated thereby for controlling the flow of air through the other of said conduits.

17. In combination, an internal combustion engine having separate passages formed therein to convey separate charges of fuel mixture and air to the combustion chamber, a charge forming device associated therewith including a carburetor unit having a primary mixing chamber formed therein, means for supplying fuel and air thereto to form a primary fuel mixture, an auxiliary air inlet in said carburetor unit, separate conduits connecting the separate passages in the engine with the primary mixing chamber and auxiliary air inlet respectively whereby one of said conduits conveys air only and the other fuel mixture, a primary throttle for controlling the flow of fuel mixture through one of said conduits, a secondary throttle for controlling the flow of air through the other of said conduits and means for operating said throttles concurrently.

18. In combination, an internal combustion engine having separate passages formed therein to convey separate charges of fuel mixture and air to the combustion chamber, a charge forming device associated therewith including a carburetor unit having a primary mixing chamber formed therein, means for supplying fuel and air thereto to form a primary fuel mixture, an auxiliary air inlet in said carburetor unit, separate conduits connecting the separate passages in the engine with the primary mixing chamber and auxiliary air inlet respectively whereby one of said conduits conveys air only and the other fuel mixture, a primary throttle for controlling the flow of fuel mixture through one of said conduits, a secondary throttle for controlling the flow of air through the other of said conduits, common operating means for said throttle valves, said operating mechanism including means for operating one of said throttle valves in advance of the other.

19. In combination, an internal combustion engine having separate passages formed therein to convey separate charges of fuel mixture and air to the combustion chamber, a charge forming device associated therewith including a carburetor unit having a primary mixing chamber formed therein, means for supplying fuel and air thereto to form a primary fuel mixture, an auxiliary air inlet in said carburetor unit, separate conduits connecting the separate passages in the engine with the primary mixing chamber and auxiliary air inlet respectively whereby one of said conduits conveys air only and the other fuel mixture, a primary throttle for controlling the flow of fuel mixture through one of said conduits, a secondary throttle for controlling the flow of air through the other of said conduits, common operating means for said throttle valves, said operating means comprising an operating member having a lost motion connection with the air throttle, whereby the primary throttle is opened in advance of the air throttle.

20. In combination, an internal combustion engine having separate passages formed therein to convey separate charges of fuel mixture and air to the combustion chamber, a charge forming device associated therewith including a carburetor unit having a primary mixing chamber formed therein, means for supplying fuel and air thereto to form a primary fuel mixture, an auxiliary air inlet in said carburetor unit, separate conduits connecting the separate passages in the engine with the primary mixing chamber and auxiliary air inlet respectively whereby one of said conduits conveys air only and the other fuel mixture, a primary throttle for controlling the flow of fuel mixture through one of said conduits, a secondary throttle for controlling the flow of air through the other of said conduits, common operating means for said throttle valves, said operating means being constructed to operate the mixture throttle only up to a predetermined engine speed, whereby at lower speeds than said predetermined speed the conduit conveying air to the combustion chamber is closed and the engine is operated on the primary fuel mixture.

21. In combination, an internal combustion engine having separate passages formed therein to convey separate charges of fuel mixture and air to the combustion chamber, a charge forming device associated therewith including a carburetor unit having a primary mixing chamber formed therein, means for supplying fuel and air thereto to form a primary fuel mixture, an auxiliary air inlet in said carburetor unit, separate conduits connecting the separate passages in the engine with the primary mixing chamber and auxiliary air inlet respectively whereby one of said conduits conveys air only and the other fuel mixture, a primary throttle for controlling the flow of mixture through one of said conduits, and means for temporarily retarding the flow of air through the other of said conduits during the acceleration period following opening movement of the throttle.

22. In combination, an internal combustion engine having separate passages formed therein to convey separate charges of fuel mixture and air to the combustion chamber, a charge forming device associated therewith including a carburetor unit having a primary mixing chamber formed therein, means for supplying fuel and air thereto to form a primary fuel mixture, an auxiliary air inlet in said carburetor unit, separate conduits connecting the separate passages in the engine with the primary mixing chamber and auxiliary air inlet respectively whereby one of said conduits conveys air only and the other fuel mixture, a primary throttle for controlling the flow of mixture through one of said conduits, a suction operated valve controlling the flow of air through the other of said conduits, and means for temporarily retarding the opening of said valve during the acceleration period following opening movement of the throttle.

23. In combination, an internal combustion engine having separate passages formed therein to convey separate charges of fuel mixture and air to the combustion chamber, a charge forming device associated therewith including a carburetor unit having a primary mixing chamber formed therein, means for supplying fuel and air thereto to form a primary fuel mixture, an auxiliary air inlet in said carburetor unit, separate conduits connecting the separate passages in the engine with the primary mixing chamber and auxiliary air inlet respectively whereby one of said conduits conveys air only and the other fuel mixture, a primary throttle for controlling the flow of fuel mixture through one of said conduits, a secondary throttle for controlling the flow of air through the other of said conduits, a suction operated valve also controlling the flow of air through the last named conduit, and means temporarily retarding the opening of said suction operated valve during the acceleration period following opening movement of the throttle.

24. The method of operating an internal combustion engine which includes the steps of introducing into the cylinder or cylinders of said engine under certain operating conditions a single charge of properly combustible fuel mixture, and under other operating conditions introducing separate charges of fuel mixture and diluting air into the cylinder or cylinders in such quantities that the proportion of air to fuel within the cylinder or cylinders is such that under said other operating conditions the engine is operated on a final mixture leaner than that which is normally ignitible by spark.

25. The method of operating an internal combustion engine which includes the steps of introducing into the cylinder or cylinders of said engine under relatively low speed operating conditions a single charge of properly combustible fuel mixture, and under relatively high speed operating conditions introducing separate charges of fuel mixture and diluting air into the cylinder or cylinders in such quantities that the proportion of air to fuel within the cylinder or cylinders is greater than sixteen to one, whereby under such relatively high speed conditions the engine is operated on a leaner than normally combustible mixture.

26. A charge forming device for multicylinder internal combustion engines comprising a plurality of separate primary carburetors for forming charges comprising a mixture of air and fuel, means for conveying these charges of air and fuel to the cylinders of said engine, said means being so constructed as to convey said charges of fuel mixture without further air dilution under certain operation conditions, means for introducing air separately into the cylinders under other operating conditions in addition to the charges of fuel mixture, the means for introducing air and fuel mixture into the cylinders being constructed to introduce such quantities of air and fuel mixture into the cylinders that the proportion of air to fuel is greater than that on which the engine is normally operable, and means for effecting combustion of the final mixture.

FRED E. ASELTINE.